(12) United States Patent
Dattawadkar et al.

(10) Patent No.: US 10,072,747 B2
(45) Date of Patent: Sep. 11, 2018

(54) TORQUE CONVERTER HAVING A COVER AND IMPELLER WELD WITH A CONSTRAINED DIAMETER AND METHOD OF WELDING THE COVER AND IMPELLER

(71) Applicant: Schaeffler Technologies AG & Co. KG, Herzogenaurach (DE)

(72) Inventors: Aditya Dattawadkar, Wooster, OH (US); Timothy Simon, Wooster, OH (US); John Kachline, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 325 days.

(21) Appl. No.: 14/744,751

(22) Filed: Jun. 19, 2015

(65) Prior Publication Data

US 2016/0369878 A1   Dec. 22, 2016

(51) Int. Cl.
*F16H 41/24* (2006.01)
*F16H 41/28* (2006.01)
*B23K 31/02* (2006.01)
*B23K 9/00* (2006.01)

(52) U.S. Cl.
CPC ............... *F16H 41/24* (2013.01); *B23K 9/00* (2013.01); *B23K 31/02* (2013.01); *F16H 41/28* (2013.01); *F16H 2041/243* (2013.01)

(58) Field of Classification Search
CPC ........................... F16H 41/28; F16H 2041/243

USPC ............................................................. 60/364
See application file for complete search history.

(56) References Cited

U.S. PATENT DOCUMENTS

| | | |
|---|---|---|
| 4,867,641 A | 9/1989 | Okuno et al. |
| 5,839,643 A | 11/1998 | Inoue et al. |
| 2005/0061596 A1 | 3/2005 | Tsuzuki et al. |
| 2008/0053772 A1* | 3/2008 | Biggers .................. B23K 9/173 192/3.29 |
| 2016/0290461 A1* | 10/2016 | Momiyama ............. F16H 41/28 |

FOREIGN PATENT DOCUMENTS

WO    WO2015080133 A1 *  6/2015  ............. F16H 41/28

\* cited by examiner

*Primary Examiner* — F. Daniel Lopez
*Assistant Examiner* — Daniel Collins
(74) *Attorney, Agent, or Firm* — Brooks Kushman P.C.

(57) ABSTRACT

A torque converter, including: a cover including: a first portion having a first surface facing at least partially in a first axial direction and a second portion extending past the first surface in the first axial direction; an impeller including: an impeller shell with a third portion: disposed radially outward of the second portion; overlapping the second portion in a radial direction such that a first line passes through the second and third portions and having a second surface: facing in a second axial direction and adjacent to and aligned with the first surface in the first axial direction such that a second line passes through the first and second surfaces; at least one blade connected to the impeller shell; and a weld fixedly securing the cover to the impeller and in contact with the first and third portions.

16 Claims, 9 Drawing Sheets

US 10,072,747 B2

TORQUE CONVERTER HAVING A COVER AND IMPELLER WELD WITH A CONSTRAINED DIAMETER AND METHOD OF WELDING THE COVER AND IMPELLER

TECHNICAL FIELD

The present disclosure relates generally to a torque converter, and, more specifically, to a cover and impeller weld for a torque converter featuring a constrained diameter. The present disclosure also relates to a method of welding a cover and an impeller for a torque converter featuring a constrained diameter.

BACKGROUND

Typically, the cover of a torque converter is welded to the impeller of the torque converter. The respective rims of cover and the impeller are machined such that there is sufficient overlap or weld trap at the joint and the space is suitable for welding, for example, using metal inert gas welding (MIG). Machining is expensive and requires additional material. In order to weld the cover and the impeller, a welding torch is typically employed. Due to the "L"-shaped surface area of the joint between the cover and the impeller to be welded, typically the welding torch must be applied at an angle. Unfortunately, due to the angle of the welding torch, contamination from the welding can infiltrate the impeller beyond the overlap or weld trap due to stamping tolerances. The cover and impeller can also be cold formed however, a significant amount of raised material results and such raised material, for example, a sharp point, can create safety hazards. Additionally, such raised material can pose problems for providing a torque converter within a transmission envelope having limited space requirements.

BRIEF SUMMARY

According to aspects illustrated herein, there is provided a torque converter, including: an axis of rotation; a cover arranged to receive torque and including: a first portion having a first surface facing at least partially in a first axial direction and a second portion extending past the first surface in the first axial direction; an impeller including: an impeller shell with a third portion: disposed radially outward of the second portion; overlapping the second portion in a radial direction such that a first line, orthogonal to the axis of rotation, passes through the second and third portions and having a second surface: facing in a second axial direction, opposite the first axial direction and adjacent to and aligned with the first surface in the first axial direction such that a second line, in the first axial direction, passes through the first and second surfaces; at least one blade connected to the impeller shell; and a weld fixedly securing the cover to the impeller and in contact with the first and third portions.

According to aspects illustrated herein, there is provided a torque converter, including: an axis of rotation; a cover arranged to receive torque and including: a first portion having a first surface facing at least partially in a first axial direction and a second portion extending past the first surface in the first axial direction; an impeller including: an impeller shell with a third portion: disposed radially inward of the second portion; overlapping the second portion in a radial direction such that a first line, orthogonal to the axis of rotation, passes through the second and third portions; and, having a second surface: facing in a second axial direction, opposite the first axial direction; and, adjacent to and aligned with the first surface in the first axial direction such that a second line, in the first axial direction, passes through the first and second surfaces; and, at least one blade connected to the impeller shell; and, a weld fixedly securing the cover to the impeller and in contact with the second and third portions.

According to aspects illustrated herein, there is provided a method of welding a cover and an impeller shell for a torque converter including: fabricating the cover for the torque converter including: a first portion having a first surface and a second portion; fabricating the impeller shell for the torque converter with a third portion including a second surface; assembling the cover and the impeller shell such that: the first surface faces at least partially in a first axial direction, the second portion extends past the first surface in the first axial direction, the third portion is: radially outward of the second portion and aligned with the second portion so that a first line orthogonal to an axis of rotation for the torque converter passes through the second and third portions, the second surface faces a second axial direction, opposite the first axial direction, the second surface is adjacent to and aligned with the first surface in the first axial direction such that a second line, in the first axial direction, passes through the first and second surfaces; positioning welding material proximate the first and second surfaces; aligning an energy source radially outward of the cover and impeller shell; transmitting energy from the energy source to the welding material in a direction parallel to the first line; and melting the welding material against the cover and the impeller shell.

BRIEF DESCRIPTION OF THE SEVERAL VIEWS OF THE DRAWINGS

The nature and mode of operation of the present disclosure will now be more fully described in the following detailed description taken with the accompanying figures, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and, as such, may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the disclosure. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
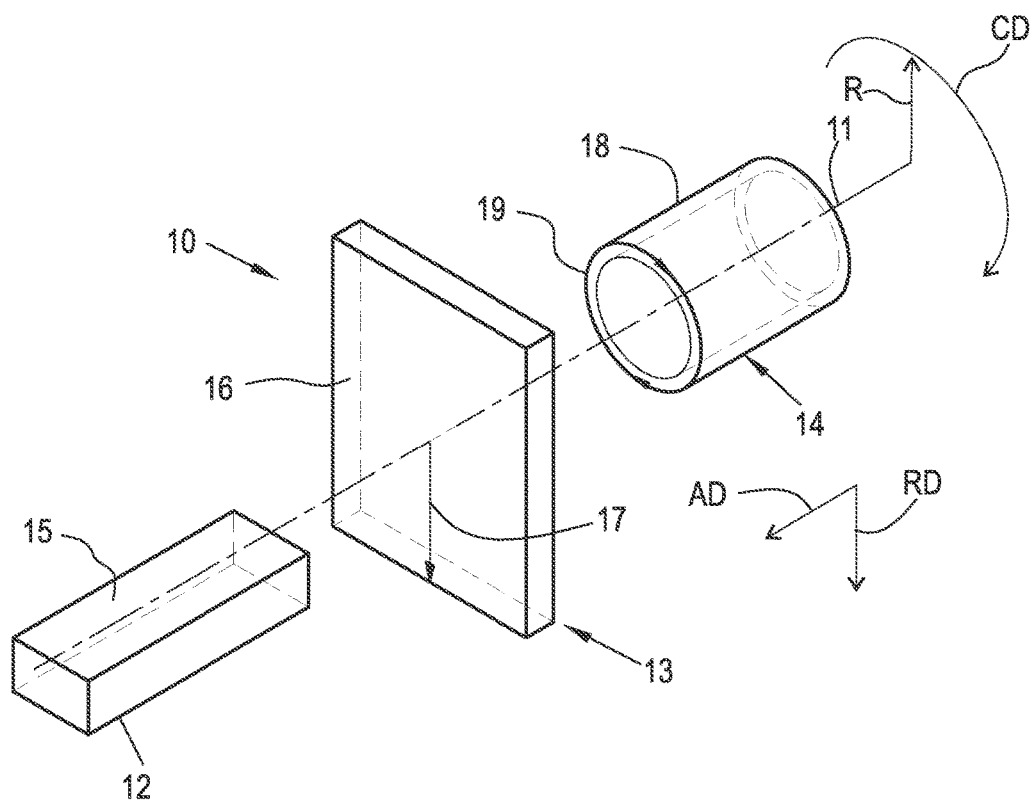
FIG. 1 is a perspective view of a cylindrical coordinate system demonstrating spatial terminology used herein.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
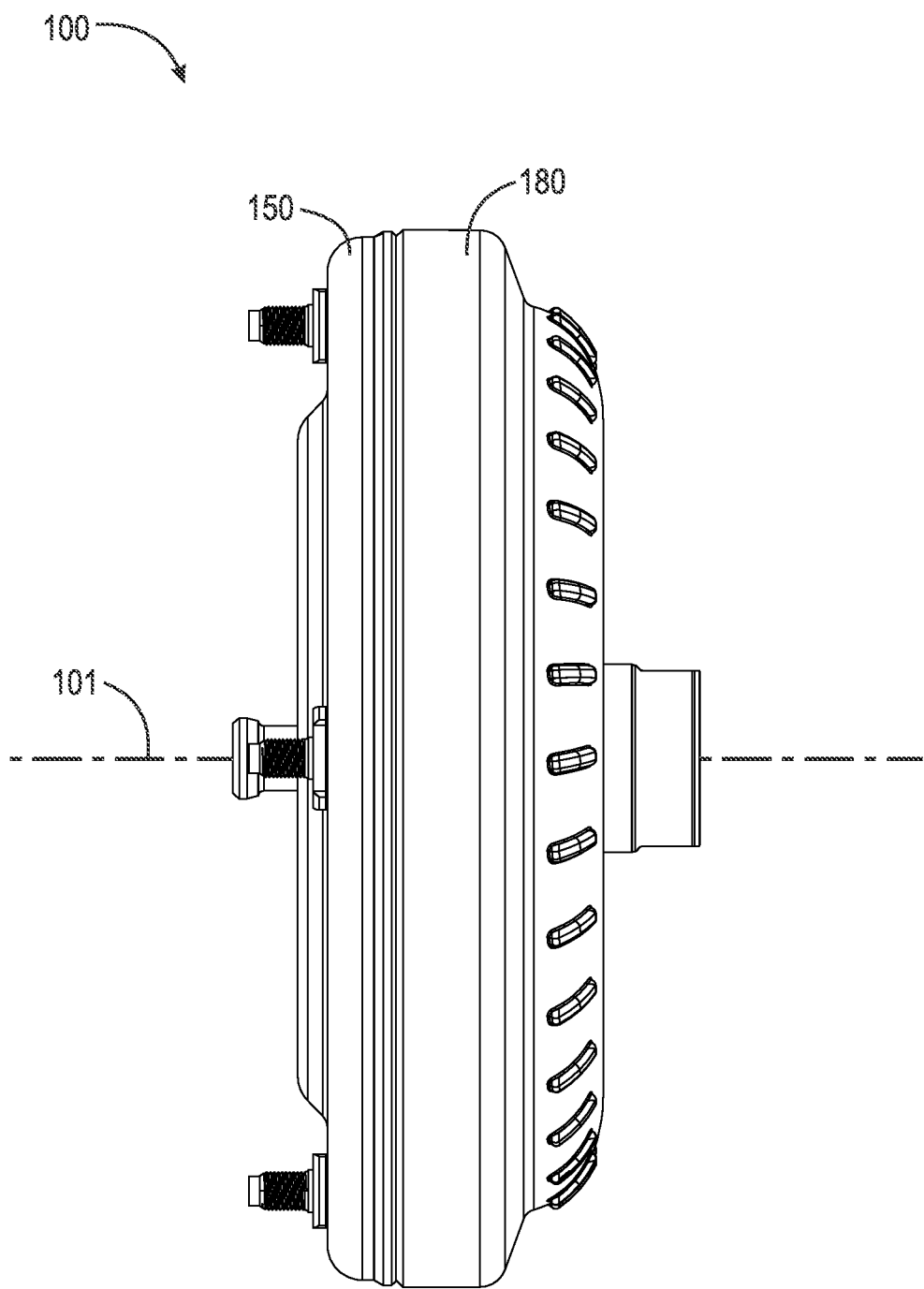
FIG. 2 is left side elevational view of a cover and an impeller of a torque converter having a constrained outer diameter without welding.

FIG. 2 is left side elevational view of cover 150 and impeller 180 of torque converter 100 having a constrained outer diameter without welding.

Figure 3:
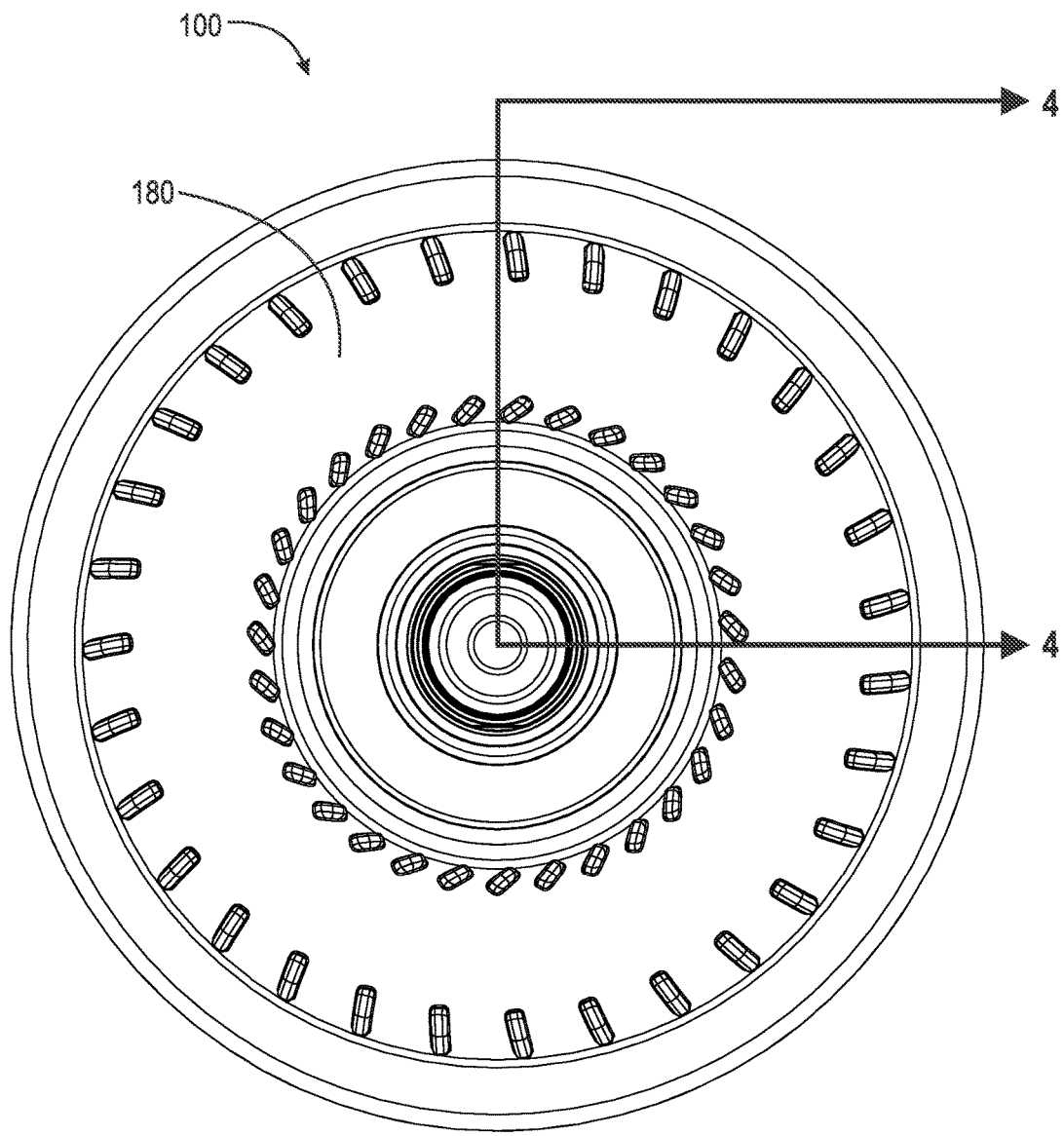
FIG. 3 is a front view of FIG. 2.

FIG. 3 is a front view of torque converter 100 shown in FIG. 2.

Figure 4:
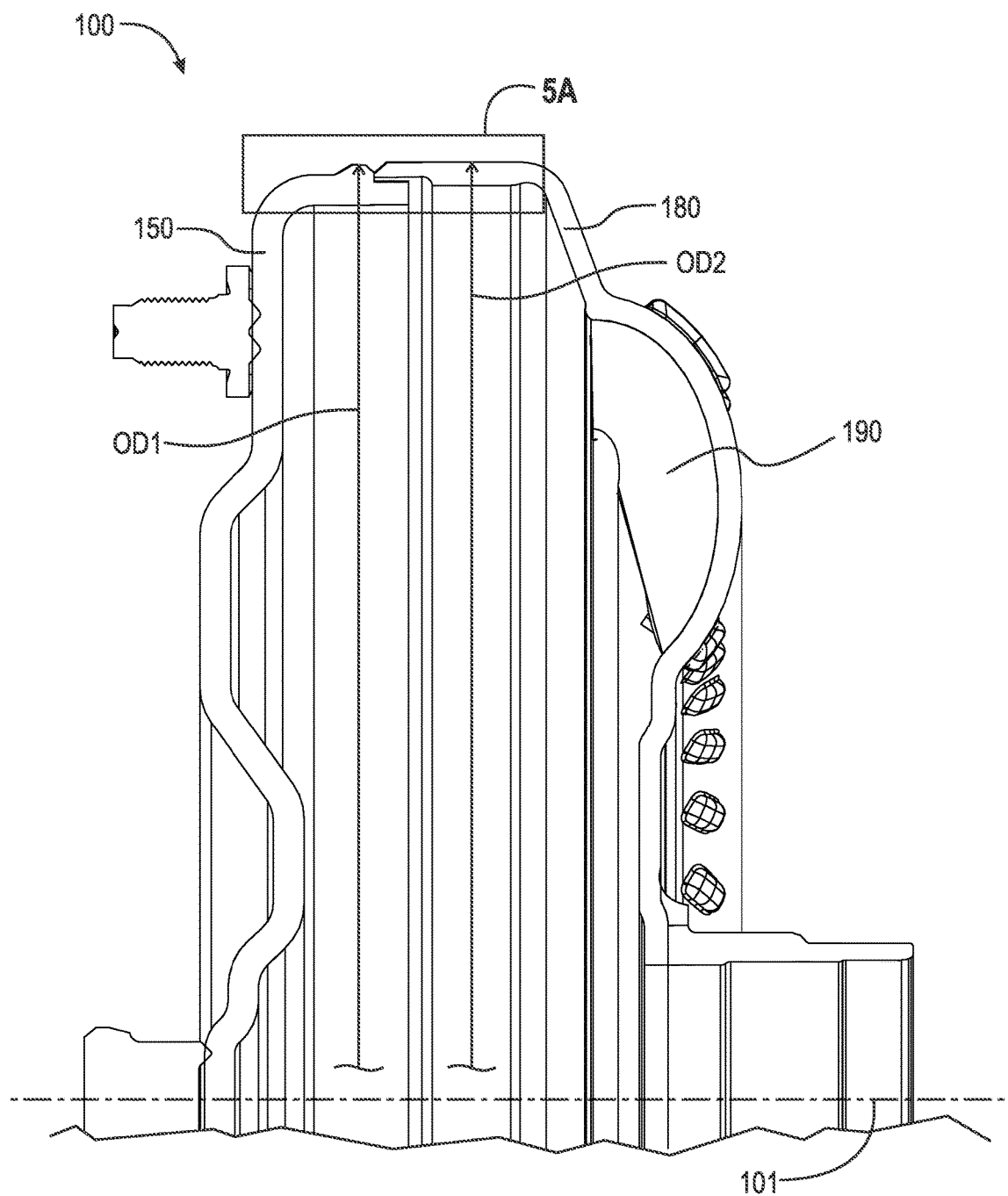
FIG. 4 is a cross-sectional view taken generally along line 4-4 in FIG. 3.

FIG. 4 is a cross-sectional view of torque converter 100 taken generally along line 4-4 in FIG. 3.

Figure 5A:
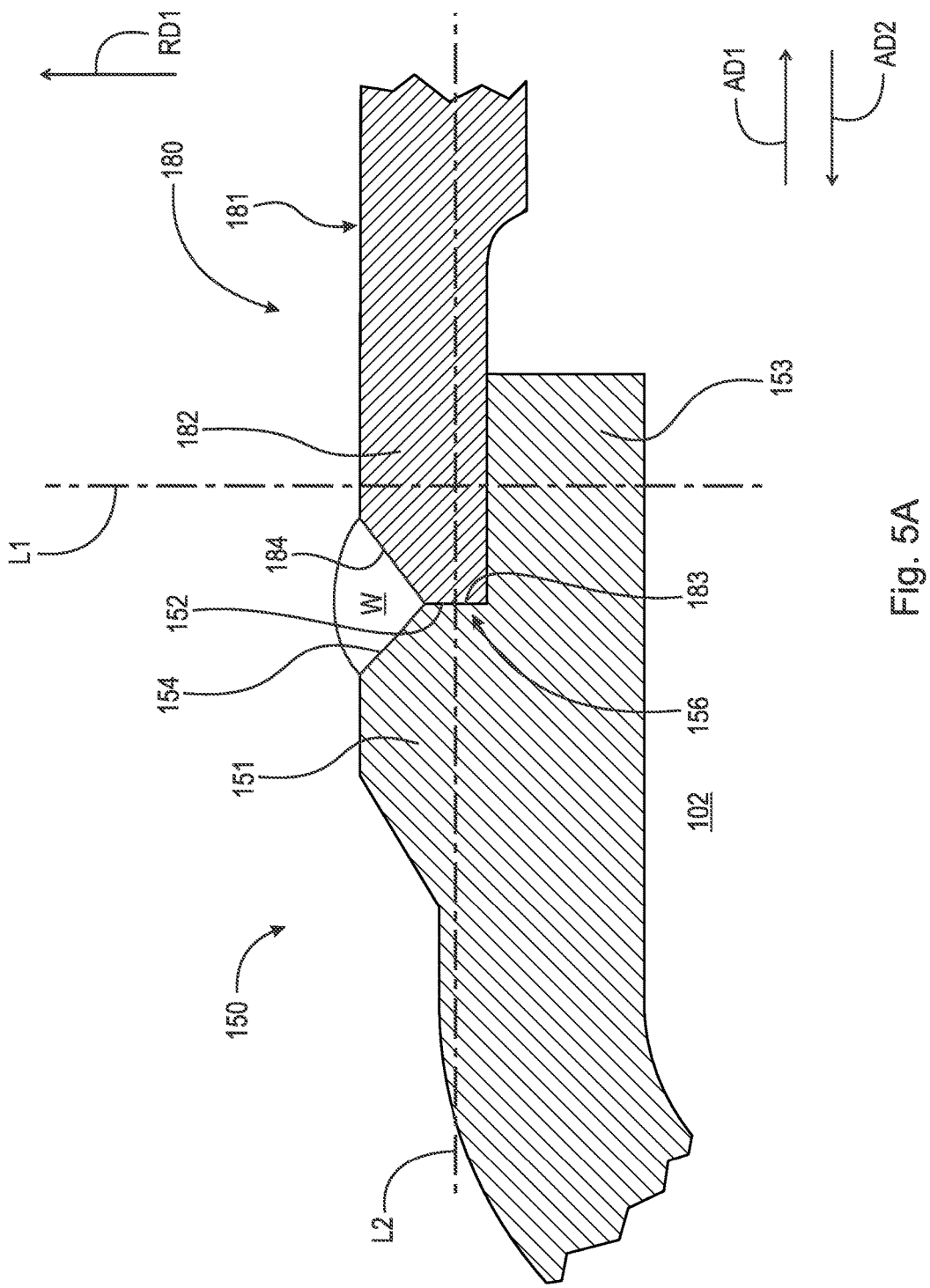
FIG. 5A is an enlarged view of the portion shown in FIG. 4, showing welding and a deadstop.

FIG. 5A is an enlarged view of portion 5A shown in FIG. 4, showing welding and a deadstop.

Figure 5B:
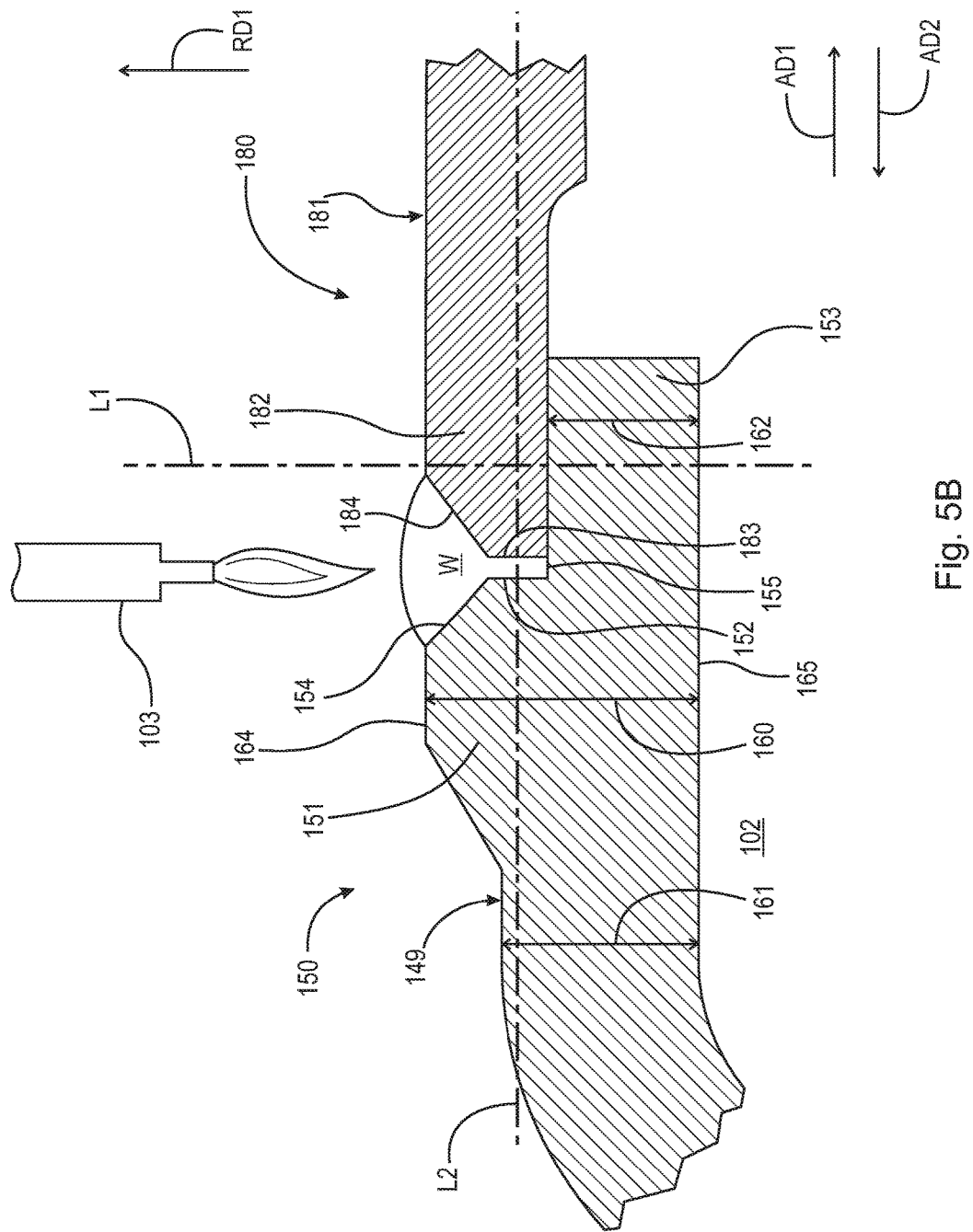
FIG. 5B shows FIG. 5A with the deadstop removed.

FIG. 5B shows FIG. 5A with the deadstop removed. The following should be viewed in light of FIGS. 2 through 5B. Torque converter 100 includes axis of rotation 101, cover 150, impeller 180 and weld W. Torque converter 100 is arranged to rotate about axis of rotation 101. Cover 150 is arranged to receive torque and includes cover shell 149, portion 151 having surface 152 facing at least partially in axial direction AD1, and portion 153 extending past surface 152 in axial direction AD1. Impeller 180 includes impeller shell 181 with portion 182 disposed radially outward of portion 153 and overlapping portion 153 in radial direction RD1 such that line L1, orthogonal to axis of rotation 101, passes through portions 153 and 182. Portion 182 also includes surface 183 facing in axial direction AD2, opposite axial direction AD1 and adjacent to and aligned with surface 152 in axial direction AD1 such that line L2, in axial direction AD1, passes through surfaces 152 and 183. Impeller 180 further includes at least one blade 190 (shown in FIG. 4) connected to impeller shell 181. Weld W fixedly secures cover 150 to impeller 180 such that cover 150 is non-rotatably connected to impeller 180 and weld W is in contact with portions 151 and 182. By "non-rotatably connected", we mean that the elements are connected so that whenever one element rotates, the other elements rotate and vice versa. Radial and/or axial movement of one or all of the elements with respect to each other is possible, but not required, when the elements are non-rotatably connected. In an example embodiment, metal inert gas (MIG) or tungsten inert gas (TIG) welding is used to form weld W.

In an example embodiment, when cover 150 is welded to impeller 180, interior 102 is formed and surfaces 152 and 183 are separated from interior 102 by portion 153.

In an example embodiment, chamfer 154 extends radially outward from surface 152 and at least a portion of chamfer 154 is in contact with weld W. In an example embodiment, chamfer 184 extends radially outward from surface 183 and at least a portion of chamfer 184 is in contact with weld W. In an example embodiment, chamfer 154 extends in axial direction AD2 and chamfer 184 extends in axial direction AD1. Chamfers 154 and 183 each provide additional surface area for weld W. In an example embodiment, chamfers 154 and 184 are arranged at an angle of approximately 45 degrees to provide space for a weld torch to access the weld joint. By the term "the weld joint" we mean where the weld is applied to fixedly secure the cover to the impeller.

In an example embodiment, cover 150 has outer diameter OD1 and impeller 180 has outer diameter OD2 and outer diameters OD1 and OD2 are substantially equal.

In the example embodiment of FIG. 5A, surfaces 152 and 183 are in contact forming deadstop 156. Since surfaces 152 and 183 are in contact and due to the overlapping of portions 153 and 182, the negative effects from welding, for example, splatter, are reduced. In the example embodiment of FIG. 5B, surface 152 is not in contact with surface 183 and weld W is disposed between at least respective portions of surfaces 152 and 183.

In the example embodiment of FIG. 5B, portion 153 includes surface 155 facing radially outward in radial direction RD1 and weld W is in contact with at least a portion of surface 155. When surfaces 152 and 183 are not in contact, there is a greater chance of contamination from welding. However, the overlapping of portions 153 and 182 and the orientation of energy source 103, for example, a weld torch, reduce the chances of contamination reaching interior 102.

In an example embodiment (not shown), surface 152 extends in radial direction RD1 further than surface 183. In an example embodiment (not shown), surface 183 extends in radial direction RD1 further than surface 152.

Figure 5C:
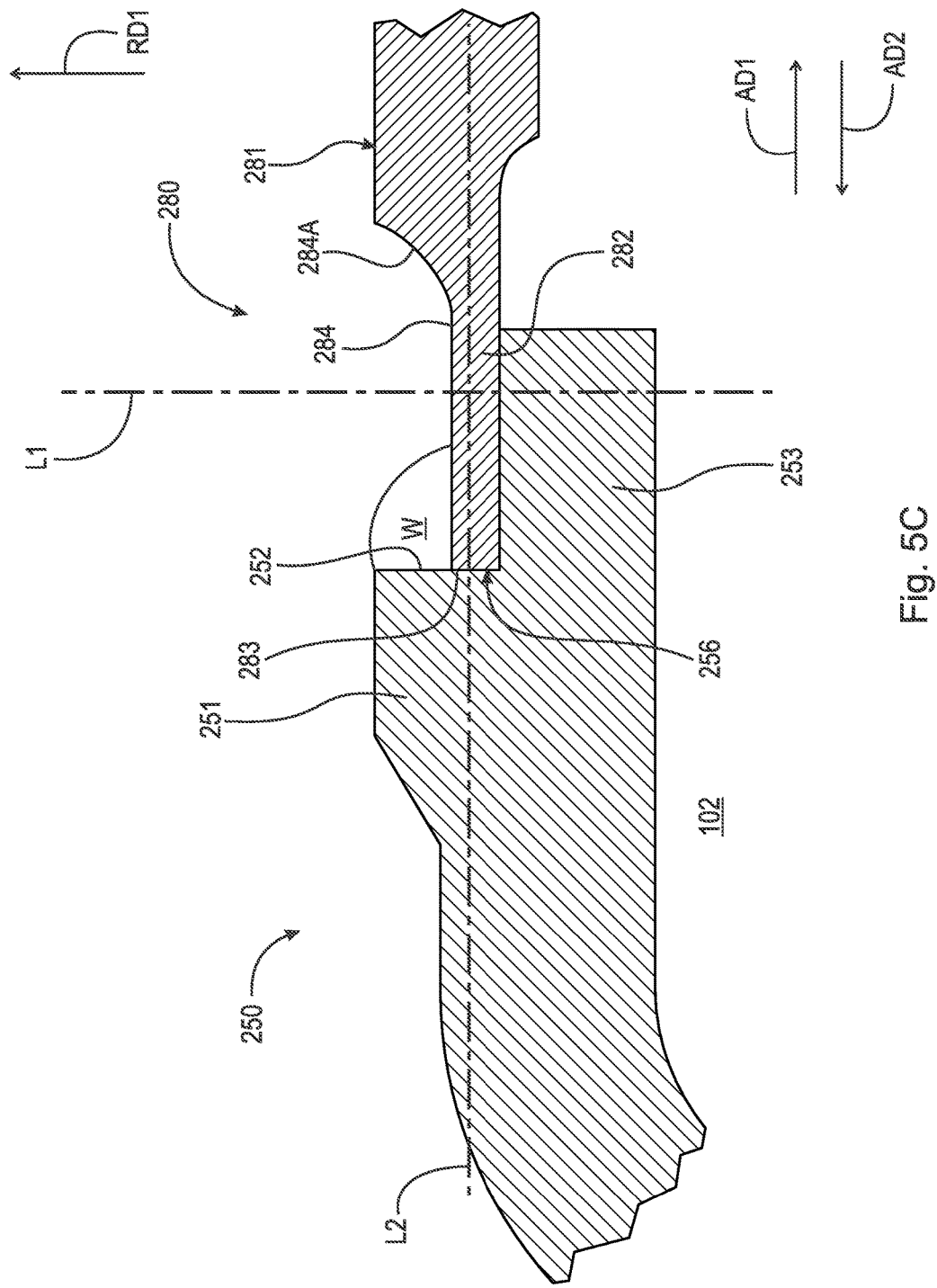
FIG. 5C is an enlarged view showing a cover and an impeller welded with a deadstop.

FIG. 5C is an enlarged view showing cover 250 and impeller 280 with weld W and a deadstop.

Figure 5D:
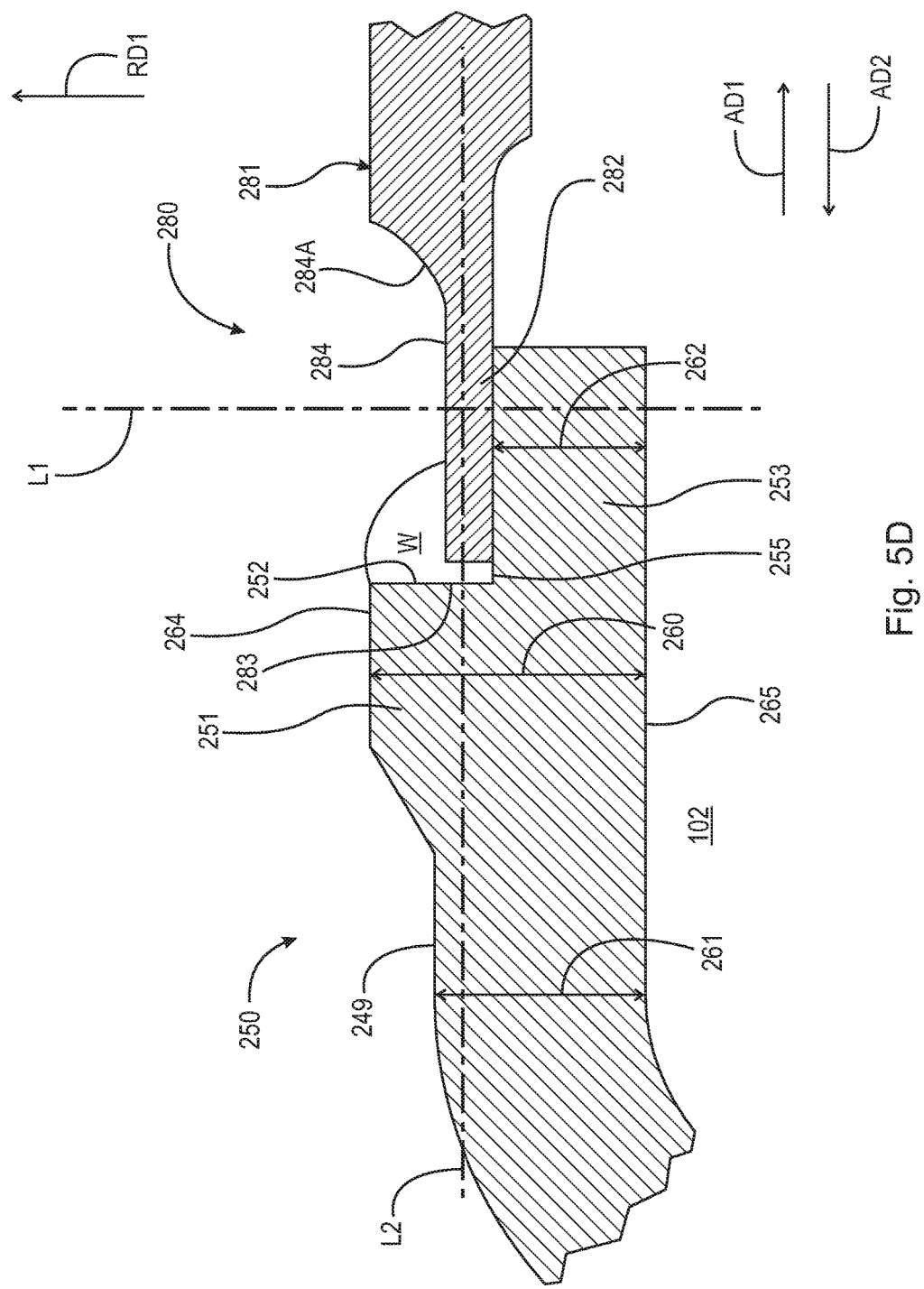
FIG. 5D shows FIG. 5C with the deadstop removed.

FIG. 5D shows FIG. 5C except the deadstop is removed. The following should be viewed in light of FIGS. 2 through 4, 5C and 5D. The discussion above pertaining to torque converter 100 and weld W and their structural features applies to cover 250 and impeller 280 except as noted. Cover 250 is arranged to receive torque and includes cover shell 249, and portion 251 having surface 252 facing in axial direction AD1. Cover 250 also includes portion 253 extending past surface 252 in axial direction AD1. Impeller 280 includes impeller shell 281 with portion 282 disposed radially outward of portion 253, overlapping portion 253 in radial direction RD1 such that line L1, orthogonal to axis of rotation 101, passes through portions 253 and 282. Impeller shell 281 also includes surface 283 facing in axial direction AD2, opposite axial direction AD1, and adjacent to and aligned with surface 252 in axial direction AD1 such that line L2, in axial direction AD1, passes through surfaces 252 and 283. Weld W fixedly secures cover 250 to impeller 280 and is in contact with portions 251 and 282.

In the example embodiment of FIG. 5C, surfaces 252 and 283 are in contact forming deadstop 256. In an example embodiment, surface 252 extends radially outward between portion 253 and outer diameter OD1 (shown in FIG. 4).

In an example embodiment, portion 282 includes surface 284 radially inward of outer diameter OD1, facing radially outward in radial direction RD1 and in contact with weld W. In an example embodiment, surface 284 extends in axial direction AD1 further than portion 253. In an example embodiment, surface 284 includes arcuate surface 284A.

In the example embodiment of FIG. 5D, portion 253 includes surface 255 facing radially outward in radial direction RD1 and weld W is in contact with at least a portion of surface 255. In an example embodiment (not shown), surface 252 extends in radial direction RD1 further than surfaces 284 and 284A. In an example embodiment (not shown), surfaces 284 and 284A extend in radial direction RD1 further than surface 252.

Figure 5E:
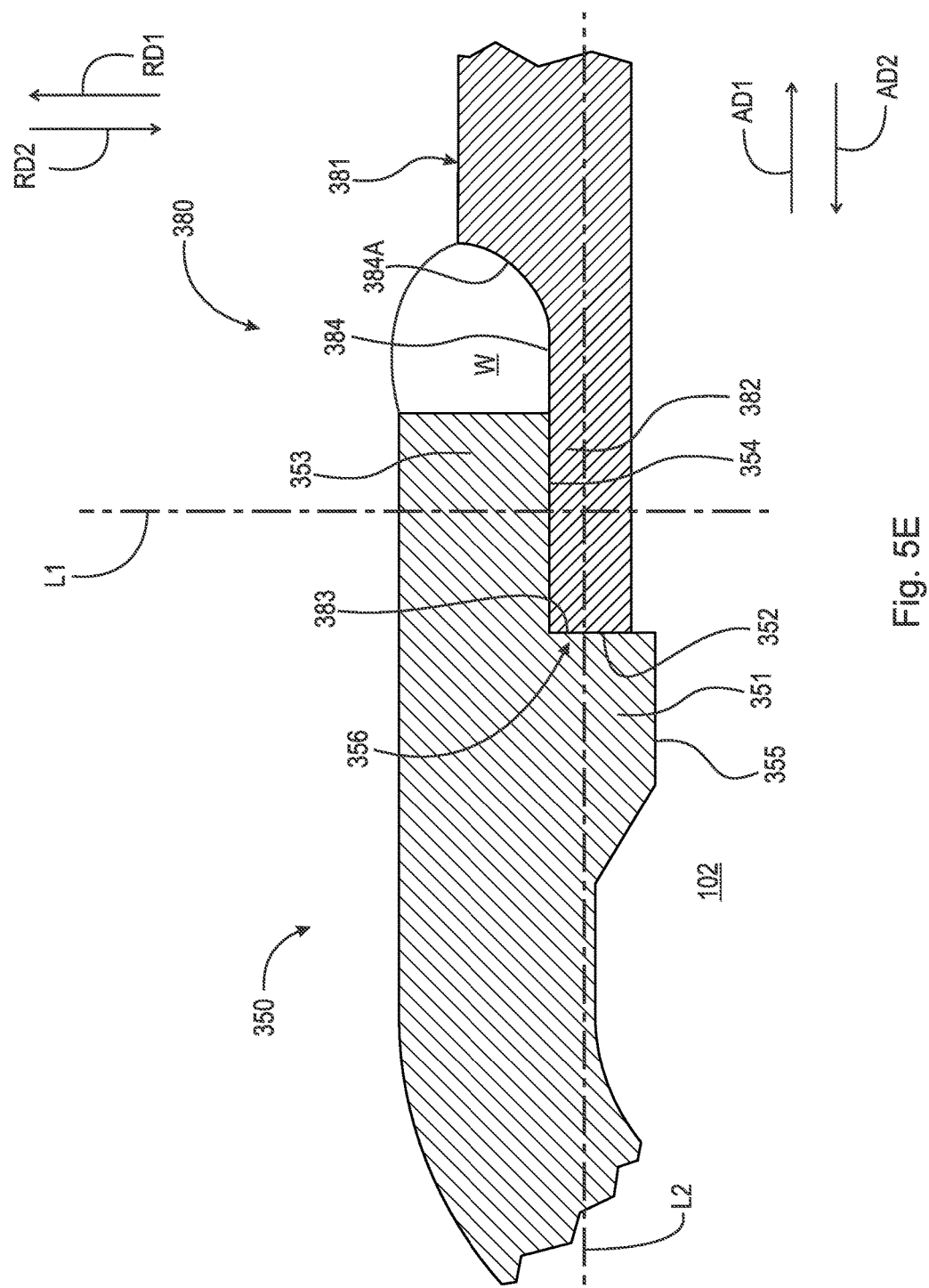
FIG. 5E is an enlarged view showing a cover and an impeller welded with a deadstop.

FIG. 5E is an enlarged modified view of portion 5A shown in FIG. 4, showing cover 350 and impeller 380 including weld W and a deadstop. The following should be viewed in light of FIGS. 2 through 4 and 5E. The discussion above pertaining to torque converter 100 and weld W and their structural features applies to cover 350 and impeller 380 except as noted. Cover 350 includes portion 351 having surface 352 facing in axial direction AD1. Cover 350 includes portion 353 extending past surface 352 in axial direction AD1. Impeller 380 includes impeller shell 381 having portion 382 disposed radially inward of portion 353, overlapping portion 353 in radial direction RD2 such that line L1, orthogonal to axis of rotation 101, passes through portions 353 and 382. Impeller shell 381 includes surface 383 facing in axial direction AD2, opposite axial direction AD1, and adjacent to and aligned with surface 352 in axial direction AD1 such that line L2, in axial direction AD1, passes through surfaces 352 and 383. Weld W fixedly secures cover 350 to impeller 380 and is in contact with portions 353 and 382.

In an example embodiment, when cover 350 is welded to impeller 380, interior 102 is formed and portion 353 is separated from interior 102 by portion 382.

In an example embodiment, surfaces 352 and 383 are in contact forming deadstop 356. In an example embodiment (not shown), surfaces 352 and 383 are separated by a space in direction AD1. In an example embodiment, surface 352 extends radially inward between portion 353 and interior 102.

In an example embodiment, portion 353 includes surface 354 facing radially inward extending in axial direction AD1 from surface 352. In an example embodiment, portion 382 includes surface 384 facing radially outward at least partially in contact with surface 354 and weld W. In an example embodiment, surface 384 includes arcuate surface 384A in contact with weld W. In an example embodiment, surface 384 extends in axial direction AD1 further than portion 353. In an example embodiment, weld W is in contact with the entirety of arcuate surface 384A.

In an example embodiment, weld W is arranged a distance from surfaces 352 and 383 in axial direction AD1.

Advantageously, the configurations shown for the combinations of cover 150 and impeller 180, cover 250 and impeller 280, and cover 350 and impeller 380 address the problems noted above with respect to weld splatter and contamination of an interior of a torque converter. For example, a welding torch is usable at a direction orthogonal to the axis for the torque converter. Thus, the torch is orthogonal to the radial overlap of the cover and the impeller, which limits or eliminates the ability of the torch to push welding splatter through the radial overlap and into the interior of the torque converter. The radial alignment of the torch is enabled by chamfers and arcuate surfaces described above. Deadstops 156, 256, and 356 present an even further physical barrier to weld splatter reaching the interior. Even without the deadstop, the reduced axial distance, between surfaces such as 152 and 183, works to further reduce the energy available to push weld splatter through the radial overlap of the cover and the impeller.

An example method of welding a cover and impeller is described below. Although the method is presented as a sequence of steps for clarity, no order should be inferred from the sequence unless explicitly stated. The following discussion should be viewed in light of FIGS. 5A and 5B showing the welding of cover 150 and impeller 180 but this discussion also pertains to the welding of cover 250 and impeller 280, respectively. An example first step involves fabricating the cover for the torque converter including: portion 151 having surface 152 and portion 153. An example second step involves fabricating the impeller shell for the torque converter with portion 182 including surface 183. These steps may be interchanged. After the cover and impeller shell are formed, an example subsequent step involves assembling the cover and the impeller shell such that: surface 152 faces at least partially in axial direction AD1, portion 153 extends past surface 152 in axial direction AD1, portion 183 is: radially outward of portion 153 and aligned with portion 153 so that line L1, orthogonal to axis of rotation 101 for torque converter 100, passes through portions 153 and 182, surface 183 faces axial direction AD2, opposite axial direction AD1, surface 183 is adjacent to and aligned with surface 152 in axial direction AD1 such that line L2, in axial direction AD1, passes through surfaces 152 and 183. An example subsequent step involves positioning welding material W proximate surfaces 153 and 183. An example subsequent step involves aligning energy source 103 radially outward of the cover and impeller shell and transmitting energy from energy source 103 to welding material W in a direction parallel to line L1 and melting welding material W against the cover and the impeller shell.

In an example embodiment, to weld the cover and impeller as described herein, no machining is required for fabricating outer circumferential surface 164 (shown in FIG. 5B) of cover 150. Referring to FIG. 5E, in an example embodiment, no machining is required for fabricating inner circumferential surface 355 of cover 350.

In an example embodiment and referring to FIG. 5B, when fabricating cover 150 for torque converter 100, dies are used to form cover 150 having thicknesses 160, 161 and 162 where thickness 160 is the distance between the stamped yet constrained outer circumferential surface 164

(OD1) and inner circumferential surface 165. Thickness 161 is the original thickness of cover 150 formed by stamping a circular blank into a bowl-shaped cover. Thickness 161 is less than thickness 160. Thickness 162 is the distance between surface 155 and inner circumferential surface 165. Thickness 162 shows that when cover 150 is stamped during formation, material is displaced proximate portion 153 and displaced to portion 151. Thickness 162 is less than both thicknesses 160 and 161.

In an example embodiment and referring to FIG. 5D, when fabricating cover 250 for torque converter 100, dies are used to form cover 250 having thicknesses 260, 261 and 262 where thickness 260 is the distance between the stamped yet constrained outer circumferential surface 264 (OD1) and inner circumferential surface 265. Thickness 261 is the original thickness of cover 250 formed by stamping a circular blank into a bowl-shaped cover. Thickness 261 is less than thickness 260. Thickness 262 is the distance between surface 255 and inner circumferential surface 265. Thickness 262 shows that when cover 250 is stamped during formation, material is displaced proximate portion 253 and displaced to portion 251. Thickness 262 is less than both thicknesses 260 and 261.

It will be appreciated that various features of the above-described disclosure and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque converter, comprising:
    an axis of rotation;
    a cover arranged to receive torque and including:
        a first portion having a first surface facing at least partially in a first axial direction; and,
        a second portion extending past the first surface in the first axial direction;
    an impeller including:
        an impeller shell with a third portion:
            disposed radially outward of the second portion;
            overlapping the second portion in a radial direction such that a first line, orthogonal to the axis of rotation, passes through the second and third portions; and,
            having a second surface:
                facing in a second axial direction, opposite the first axial direction; and,
                adjacent to and aligned with the first surface in the first axial direction such that a second line, in the first axial direction, passes through the first and second surfaces, the first surface extends in a first radial direction further than the second surface; and,
        at least one blade connected to the impeller shell; and,
    a weld fixedly securing the cover to the impeller and in contact with the first and third portions.

2. The torque converter as recited in claim 1, wherein the welded cover and impeller form an interior and the first and second surfaces are separated from the interior by the second portion of the cover.

3. The torque converter as recited in claim 1, further comprising a first chamfer extending radially outward from the first surface wherein:
    at least a portion of the first chamfer is in contact with the weld.

4. The torque converter as recited in claim 3, further comprising a second chamfer extending radially outward from the second surface wherein:
    at least a portion of the second chamfer is in contact with the weld.

5. The torque converter as recited in claim 4, wherein the first chamfer extends radially outward from the weld in the second axial direction and the second chamfer extends radially outward from the weld in the first axial direction.

6. The torque converter as recited in claim 1, wherein the weld is in contact with at least respective portions of the first and second surfaces.

7. The torque converter as recited in claim 1, wherein:
    the second portion includes a third surface facing radially outward; and,
    the weld is in contact with at least a portion of the third surface.

8. The torque converter as recited in claim 1, wherein the first and second surfaces are in contact.

9. A torque converter, comprising:
    an axis of rotation;
    a cover arranged to receive torque and including:
        a first portion having a first surface facing at least partially in a first axial direction; and,
        a second portion extending past the first surface in the first axial direction;
    an impeller including:
        an impeller shell with a third portion:
            disposed radially inward of the second portion;
            overlapping the second portion in a radial direction such that a first line, orthogonal to the axis of rotation, passes through the second and third portions;
            having a second surface:
                facing in a second axial direction, opposite the first axial direction; and,
                adjacent to and aligned with the first surface in the first axial direction such that a second line, in the first axial direction, passes through the first and second surfaces; and,
            having a third surface:
                facing radially outward;
                extending past the second portion in the first axial direction; and,
                including an arcuate surface extending radially outward; and,
        at least one blade connected to the impeller shell; and,
    a weld fixedly securing the cover to the impeller and in contact with the second and third portions, at least a portion of the third surface is in contact with a weld.

10. The torque converter as recited in claim 9, wherein the welded cover and impeller form an interior and the second portion is separated from the interior by the third portion of the impeller.

11. The torque converter as recited in claim 9, wherein the first and second surfaces are in contact.

12. The torque converter as recited in claim 9, wherein the weld is in contact with the second portion and the arcuate surface.

13. The torque converter as recited in claim 12, wherein the weld is in contact with an entirety of the arcuate surface.

14. The torque converter as recited in claim 9, wherein the weld is arranged a distance from the first and second surfaces in the first axial direction.

15. The torque converter as recited in claim 9, wherein the impeller shell includes a fourth portion disposed at least partially aligned with the second portion such that a third line, in the second axial direction, passes through the second and fourth portions.

16. A method of welding a cover and an impeller shell for a torque converter, comprising:
fabricating the cover for the torque converter including fabricating an outer circumferential surface without machining the outer circumferential surface, the cover including:
a first portion having a first surface; and,
a second portion;
fabricating the impeller shell for the torque converter with a third portion including a second surface;
assembling the cover and the impeller shell such that:
the first surface faces at least partially in a first axial direction;
the second portion extends past the first surface in the first axial direction;
the third portion is:
radially outward of the second portion; and,
aligned with the second portion so that a first line orthogonal to an axis of rotation for the torque converter passes through the second and third portions;
the second surface faces a second axial direction, opposite the first axial direction; and,
the second surface is adjacent to and aligned with the first surface in the first axial direction such that a second line, in the first axial direction, passes through the first and second surfaces;
positioning welding material proximate the first and second surfaces;
aligning an energy source radially outward of the cover and impeller shell;
transmitting energy from the energy source to the welding material in a direction parallel to the first line; and,
melting the welding material against the cover and the impeller shell.

* * * * *